United States Patent
Hansen

Patent Number: 6,034,799
Date of Patent: Mar. 7, 2000

[54] TUNING SOURCE FOR LIGHTWAVE SYSTEMS

[75] Inventor: Per Bang Hansen, Bradley Beach, N.J.

[73] Assignee: Lucent Technologies Inc., Murray Hill, N.J.

[21] Appl. No.: 08/884,690

[22] Filed: Jun. 30, 1997

[51] Int. Cl.$^7$ .................................................. H04J 14/02
[52] U.S. Cl. ............................................ 359/124; 385/24
[58] Field of Search .................................. 359/124, 110, 359/189; 385/24, 37

[56] References Cited

U.S. PATENT DOCUMENTS

| | | | |
|---|---|---|---|
| 4,926,429 | 5/1990 | Chung . | |
| 5,086,349 | 2/1992 | Okayama et al. . | |
| 5,228,103 | 7/1993 | Hryniewicz et al. . | |
| 5,701,371 | 12/1997 | Ishida | 385/24 |
| 5,737,104 | 4/1998 | Lee et al. | 385/24 |
| 5,778,119 | 7/1998 | Farries | 385/24 |
| 5,841,573 | 11/1998 | Kim | 385/24 |

OTHER PUBLICATIONS

A. J. Keating and A. J. Lowery, "Wavelength Stabilization in WDM Packet–Switched Networks," Conf. on Optical Fiber Communicatinos, paper WR2, San Diego,CA, Feb., 1995 (Optical Society of America, Wash., D.C. 1995).

*Primary Examiner*—Jeffery A. Hofsass
*Assistant Examiner*—John Tweel, Jr.
*Attorney, Agent, or Firm*—Jeffery J. Brosemer

[57] ABSTRACT

Cost effectiveness and high system reliability are achieved in lightwave systems having at least one tunable sources connected to a network by incorporating a reference signal source within the network useful for tuning at least one tunable source to a predetermined wavelength. The reference signal source generates a signal in a central location within the network and distributes such signal throughout the network. This signal serves as a wavelength reference for tuning the tunable source to a desired wavelength. Transmission of the signal may occur continuously or intermittently. Such a signal may carry one or more wavelengths simultaneously. Alternatively, the reference signal can be generated by wavelength selective reflection of the signal generated by the tunable source.

12 Claims, 3 Drawing Sheets

TUNING SOURCE FOR LIGHTWAVE SYSTEMS

FIELD OF THE INVENTION

The present invention relates generally to lightwave systems and, more particularly, to improvements of tuning variable-wavelength light sources, within such systems.

BACKGROUND OF THE INVENTION

Wavelength division multiplexing in lightwave systems appears to be the most effective multiplexing means for addressing the increasingly higher bandwidth requirements of telecommunication systems. These lightwave systems rely on the availability of lightwave sources, such as lasers, to produce signals at the various wavelengths. Tunable sources are the most attractive for this application especially when their tuning range is broad enough to cover a majority of bandwidths in the lightwave system. Most tunable sources are designed in a self-contained unit having an automatic feedback control to tune and stabilize the operating wavelength of the source to a desired wavelength. Differences may occur between the operating wavelength of the installed sources and supported wavelength of the system infrastructure. These differences may hamper and even seriously degrade system performance. In such lightwave systems, there is no simple mechanism for coordinating the wavelengths of system elements to be the same. More specifically, there is no simple and cost-effective means for aligning the operating wavelength of a source with the actual wavelength expected by the lightwave system.

SUMMARY OF THE INVENTION

Cost effectiveness and high system reliability are achieved in a lightwave system having at least one tunable source connected to a network by incorporating a reference element which supplies a reference signal within the network useful for tuning at least one tunable source to a predetermined wavelength. In an embodiment of the lightwave system, the reference element is centrally located within the network to supply and transmit a reference signal at one wavelength for tuning at least one tunable source. Transmission of the reference signal may occur continuously or at periodic intervals. When the reference signal is received by the tunable source, the tunable source generates a source signal at a wavelength substantially equal to that of the reference signal. In another embodiment of the lightwave system, the reference element supplies a multiple wavelength reference signal useful for tuning a plurality of tunable sources. In yet another embodiment of the lightwave system, the reference element supplies a reference signal through wavelength selective reflection of the source signal from the tunable source.

BRIEF DESCRIPTION OF THE DRAWING

The aforementioned features and benefits of the invention will be better understood from a consideration of the detailed description, which follows, taken in conjunction with the accompanying drawings, in which.

DETAILED DESCRIPTION

Figure 1:
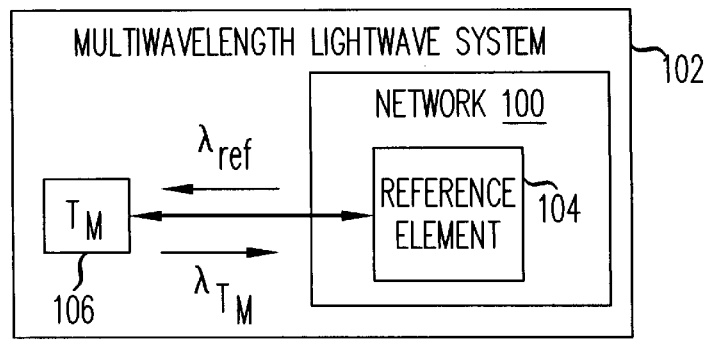
FIG. 1 depicts a simplified schematic diagram of a lightwave system in accordance with the present invention.

As shown in FIG. 1, the lightwave system 102 includes at least one tunable source 106 and a lightwave network 100. As in conventional lightwave systems, the tunable source 106 supplies a signal to the lightwave network 100 for a variety of purposes some of which include transmitting data, voice or video. For initialization of the tunable source 106, a reference element 104, located within the network 100, supplies a signal at a predetermined reference wavelength. In operation, the reference element 104, coupled to the tunable source 106 located external to the network 100, transmits the reference signal to the tunable source 106. Thereby, the tunable source 106 receives the reference signal from the reference element 104. Responsive to the reference signal, the tunable source 106 generates a source signal at a wavelength substantially equal to the reference signal's wavelength. In the same manner, the aforementioned arrangement achieves wavelength stabilization in the tunable source 106.

There exists a number of different implementations of the reference element 104. The reference element 104 may comprise an independent reference source located within the network. Alternatively, the reference element 104 may comprise one or more passive wavelength selective reflection elements that produce the reference signal in response to a signal generated by the tunable source 106. In the instance where the reference element 104 is an independent reference source, the reference element 104 may generate a reference signal at one particular wavelength continuously or intermittently. Alternatively, the reference element 104 may generate a composite reference signal having reference signals at two or more desired wavelengths.

Figure 2:
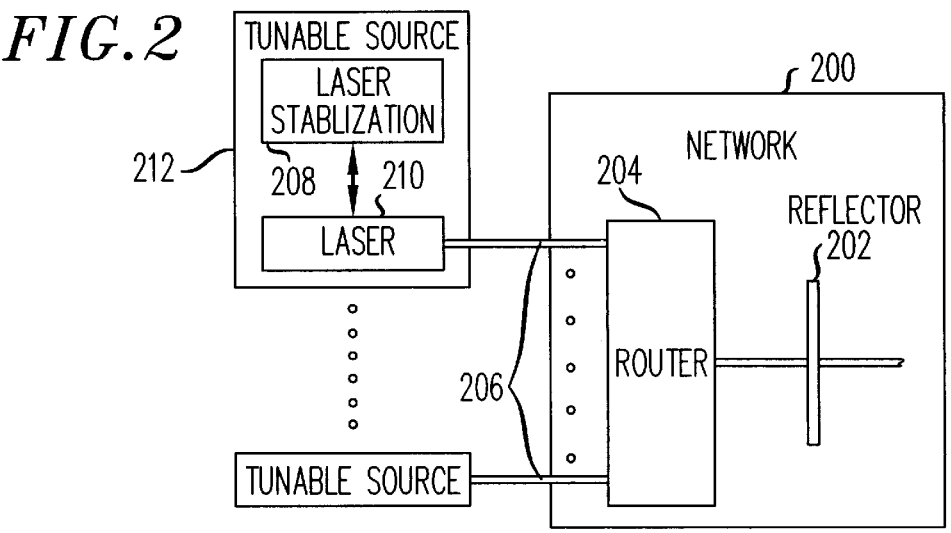
FIG. 2 illustrates a specific embodiment of the lightwave system shown in FIG. 1.

A specific embodiment of the reference element employing wavelength selective reflection of the source signal is illustrated in FIG. 2. In this Figure, a plurality of tunable sources 212, each having a laser stabilization arrangement 208 and a laser source 210 for generating a source signal, are coupled to the router 204 having a plurality of input ports 206. The router 204, coupled to a reflector 202, directs the source signal from the tunable source 212 to the reflector 202 which reflects a portion of the source signal. For simplicity and not for purposes of limitation, operation of one of the plurality of tunable sources 212 is outlined herein.

There are two requirements for the reflector 202. First, the bandwidth of the reflector 202 should include at least one wavelength sufficient to tune at least one tunable source 212 at a pre-determined wavelength. The second requirement is that the transmissivity of the reflector 202 should be such that a sufficient amount of the signal can be transmitted through to the network when the tunable source 212 is tuned.

In operation, when the source signal received at the port 206 of the router 204 is not equal to the predetermined wavelength, the portion reflected will at best be low intensity. Accordingly, the stabilization arrangement 208 of the tunable source 212 detects the intensity and controls the laser source 210 to generate a source signal at the pre-determined wavelength.

Figure 3:
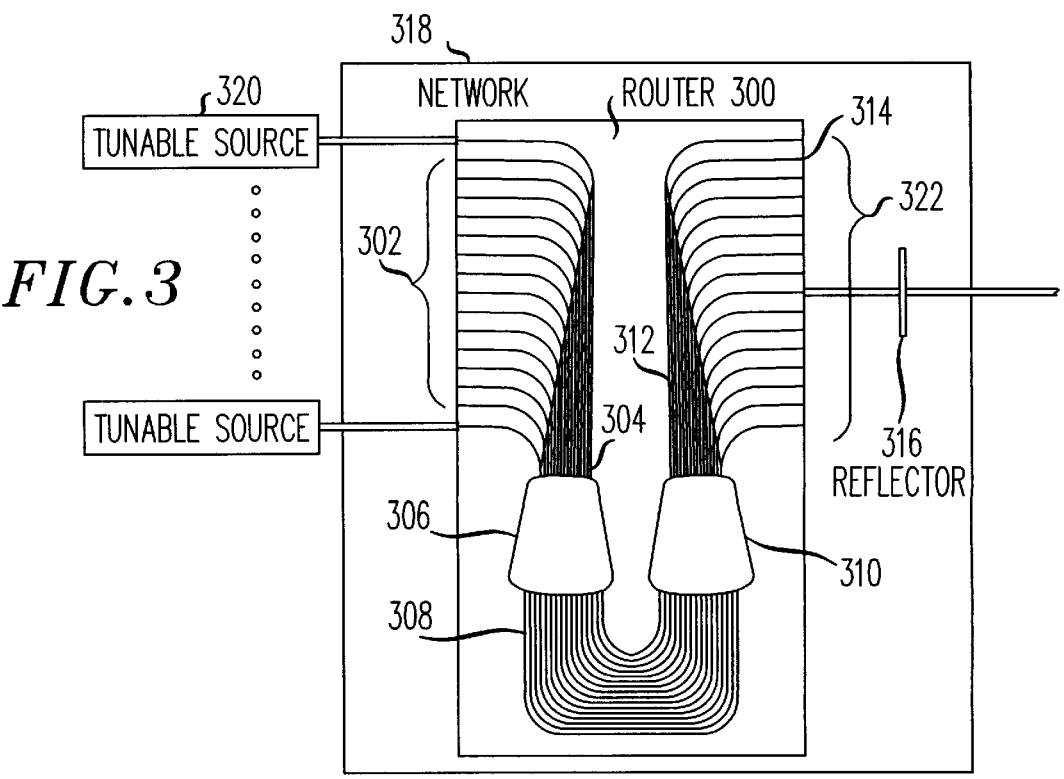
FIG. 3 shows a specific embodiment of a router usable in the lightwave system shown in FIG. 2.

For a more detailed perspective of the source signal's transmission within the lightwave system, FIG. 3 illustrates a specific embodiment of a router 300 having an input port 302, coupled to a plurality of tunable sources 320 each generating a source signal. As in FIG. 2, a reflector 316 is coupled to the router 300 for reflecting a portion of the source signal directed to it by the router 300. Within the given embodiment, a 1XN optical router may be used such as those shown in U.S. Pat. Nos. 5,002,350, 5,136,671 and 5,243,672, issued to Dragone, which are hereby incorporated by reference. Commonly, the router 300 is referred to as a waveguide grating router 300. As is well known to those skilled in the art, a waveguide grating router is an integrated lightwave interconnection apparatus capable of switching a plurality of input and output wavelength channels achieving low levels of crosstalk and insertion loss.

Particularly, as shown in FIG. 3, the waveguide grating router comprises a plurality of input ports 302, a first waveguide array 304, a first free space region 306, a waveguide grating 308, a second free space region 310 and a second waveguide array 312, forming a plurality of output ports 322, all coupled, respectively. In operation, a multiwavelength signal is directed through a predetermined one of the input ports 302 of the router 300. In waveguide grating 308, due to respective waveguides having differing lengths, curvature, and separated by a fixed amount, the source signal received at one input port 302 of the router 300 becomes phase shifted after propagation through the waveguide grating 308. As a result, the multiwavelength signal transmitted through the router 300 is separated into its wavelength components each signal diffracted in a slightly different direction. The placement of the reflector 316 is set to capture the routed signal and to ultimately reflect a portion of the signal back through the router 300 to one of the plurality of tunable sources 320.

Figure 4:
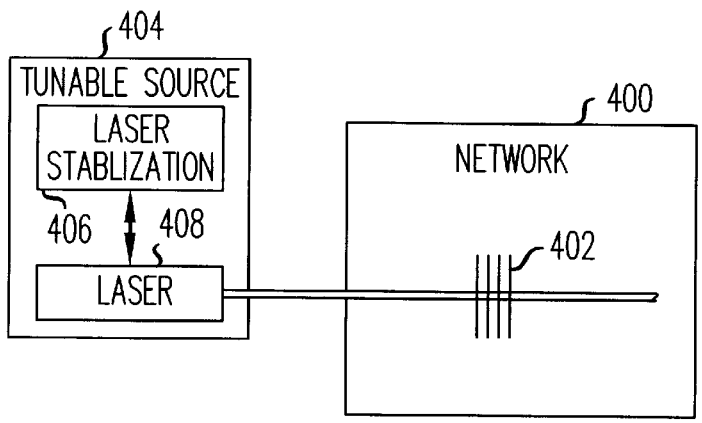
FIG. 4 represents an alternative embodiment of the lightwave system.

FIG. 4 illustrates another embodiment of the lightwave system employing wavelength selective reflection of the source signal. The lightwave system includes a network 400 having a fiber grating 402. The fiber grating 402, coupled to a tunable source 404, should have a bandwidth which includes a predetermined wavelength. Including a laser stabilization arrangement 406 and a laser source 408, the tunable source 404 launches the source signal to the network 400 intercepted by the fiber grating 402. Similar to the description provided for the operation of the embodiment illustrative in FIG. 2, the fiber grating 402 reflects a portion of the source signal. When the source signal is not equal to the predetermined wavelength, the portion reflected will at best be low intensity. Accordingly, the stabilization arrangement 406 shifts the wavelength of the source signal until it is substantially at the wavelength of the reference signal.

There are two requirements for the fiber grating 402. First, the bandwidth of the fiber grating 402 should include one wavelength sufficient to tune at least one tunable source 404. The second requirement is that the transmissivity of the fiber grating 402 should be such that a sufficient amount of the signal can transmit through to the network when the tunable source 404 is tuned.

Figure 5:
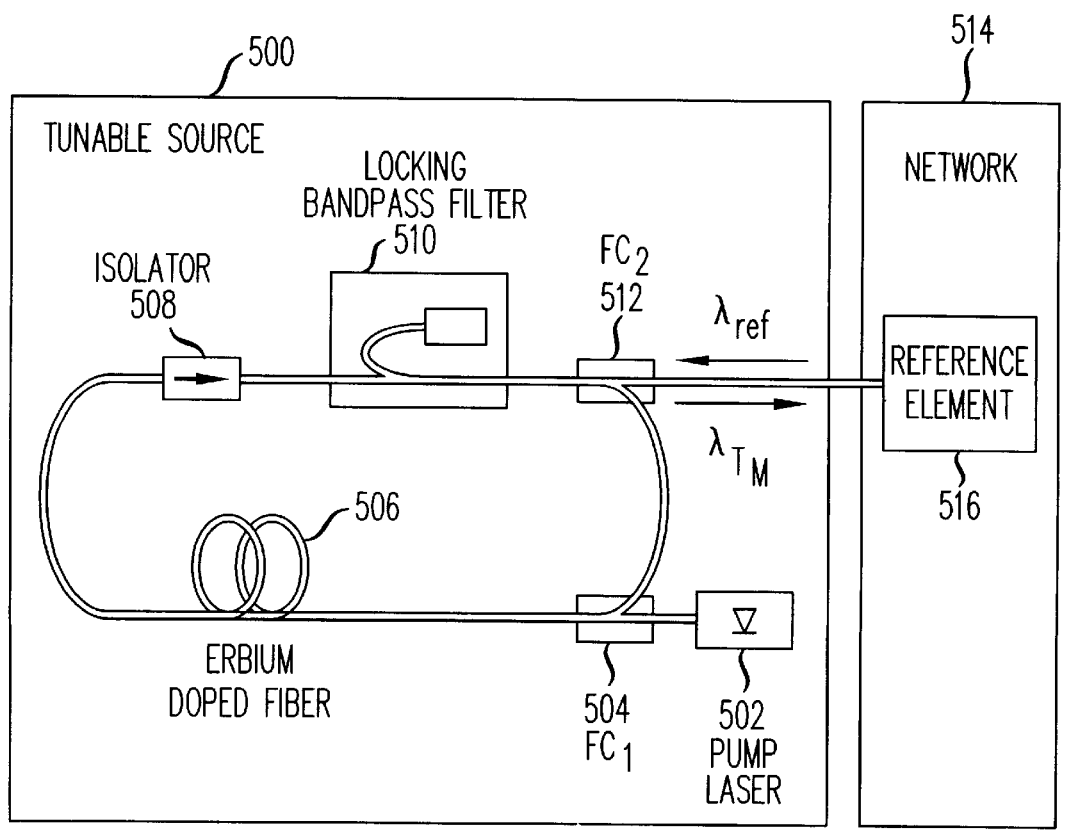
FIGS. 5, 6 and 7 depict illustrative embodiments of a tunable source usable in the lightwave system.

FIG. 5 illustrates an embodiment of the tunable source 500. The tunable source 500 includes a pump laser 502 optically coupled to a gain medium, such as erbium doped fiber 506. Supplying a beam of light to drive the gain medium, the pump laser 502 induces population inversion. Through the process of population inversion, the gain medium generates a source signal which is launched to an isolator 508 and a locking bandpass filter 510, respectively. Ultimately, the source signal transmitted through the isolator 508 and locking bandpass filter 510 provides feedback to the erbium doped fiber 506.

In operation, the reference signal from the network 514 enters the tunable source 500. The locking bandpass filter 510, within the tunable source 500, receives the reference signal. "Optical Fiber Communication Systems" (Leonid Kazovsky et al.; p. 564, 1996) describes an implementation of the locking bandpass filter 510. Well known to those skilled in the art, the locking technique is such that the bandpass filter 510 detects the intensity of the received reference signal by filtering a small fraction of the reference signal. This portion of the reference signal is used in a feedback loop to control the passband of the bandpass filter 510, wherein the bandpass filter 510 locks its passband corresponding to the maximum intensity of the reference signal. Thus, the feedback loop tunes the bandpass filter 510 to transmit a maximum of the selected bandwidth. Accordingly, the center of the bandpass filter 510 is locked at the same wavelength as the reference signal, thus ensuring that the bandpass filter 510 will not drift in relation to the reference signal. This locking technique requires that the reference signal be partially inside the wavelength range of the bandpass filter 510 for capturing and locking to occur. One may use a Fabry Perot filter as an implementation of the bandpass filter 510.

Simultaneous to the reference signal's entry into the tunable source 500, the pump laser 502 provides pump energy sufficient to enable population inversion of the erbium doped fiber 506, as explained previously. Accordingly, when the lightwave signal emitted by the erbium doped fiber 506 reaches the isolator 508, the signal passes in one direction, since the isolator 508 has a low insertion loss in one direction and a high insertion loss in the opposite. The signal propagates through the locking bandpass filter 510. As a result, the erbium doped fiber 506 coupled with feedback from the bandpass filter 510 is forced to lase at the reference signal wavelength, ultimately generating a source signal which is transmitted to the lightwave network 514. Of course, this embodiment would include a modulator (not shown) for modulating the source signal with data prior to its transmission to the network 514.

Figure 6:
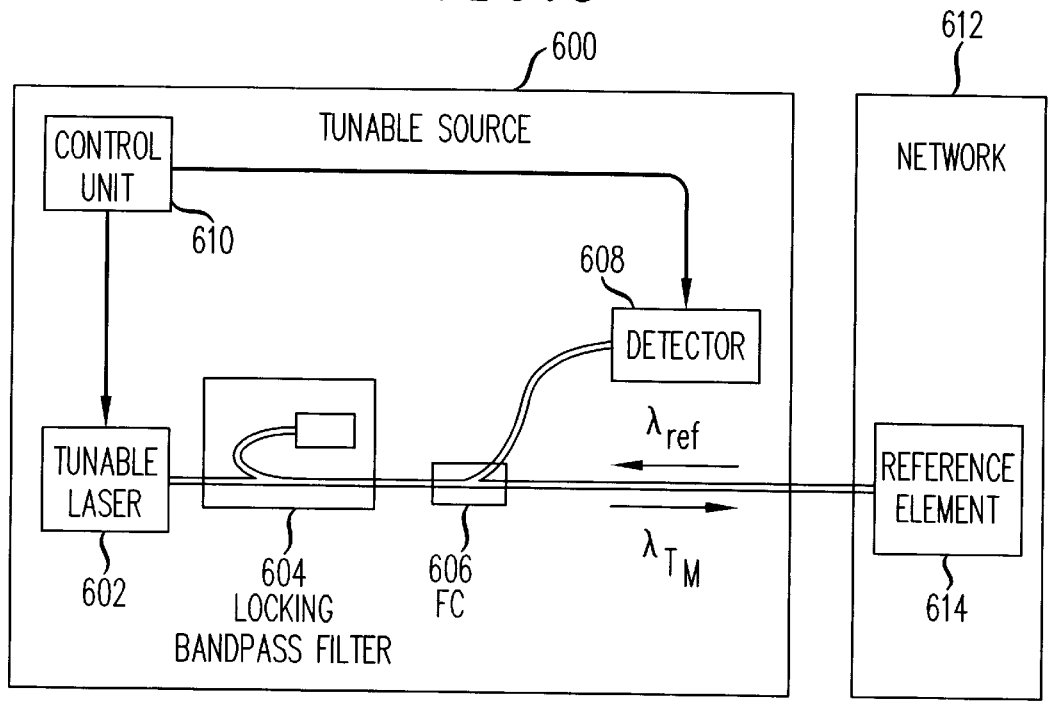

FIG. 6 illustrates another embodiment of the tunable source 600 for the lightwave system. This tunable source 600 includes a tunable laser 602, a locking bandpass filter 604 and a control arrangement, including a detector 608 and control unit 610. All elements are optically coupled one to another with the exception of the detector 608, the control unit 610 and the tunable laser 602 being electrically coupled, respectively. Similar to the operation of the tunable source illustrated in FIG. 5, the reference signal from the network 612 enters the tunable source 600 intercepted by the locking bandpass filter 604. The locking bandpass filter 604 locks its passband to the corresponding wavelength of the reference signal by adjusting its center wavelength to coincide with that of the reference signal. Simultaneously, the signal from the laser 602 propagates through the locking bandpass filter 604 where signals exhibiting the reference wavelength are filtered and passed to the detector 608. The detector 608 generates an electrical signal at a voltage proportional to the intensity of the signal received from the locking bandpass filter 604. The signal received by the detector 608 suffering the least loss—generating the highest voltage—will be identical in wavelength to the center wavelength of the filter 604 and, thus, identical to the wavelength of the reference signal. The control unit 610 receives the signal generated by the detector 608. When peak intensity of the signal from the tunable laser 602 is exhibited, its wavelength is substantially similar to the wavelength of the reference signal. Therefore, the intensity of the signal read by the detector 608 and sent to the control unit 610 is used as a variable to determine whether to increase and decrease the wavelength of the signal generated by the tunable laser 602. The control unit 610 weighs the difference between the present signal and the prior signal transmitted and generates a signal for controlling tunable laser 602 to generate a signal at an increased and decreased wavelength. The process continues until the source signal generated by the tunable laser 602 is substantially similar to the reference signal. The resulting source signal is transmitted to the network 612. Of course, this embodiment would include a modulator (not shown) for modulating the source signal with data prior to its transmission to the network 612.

Figure 7:
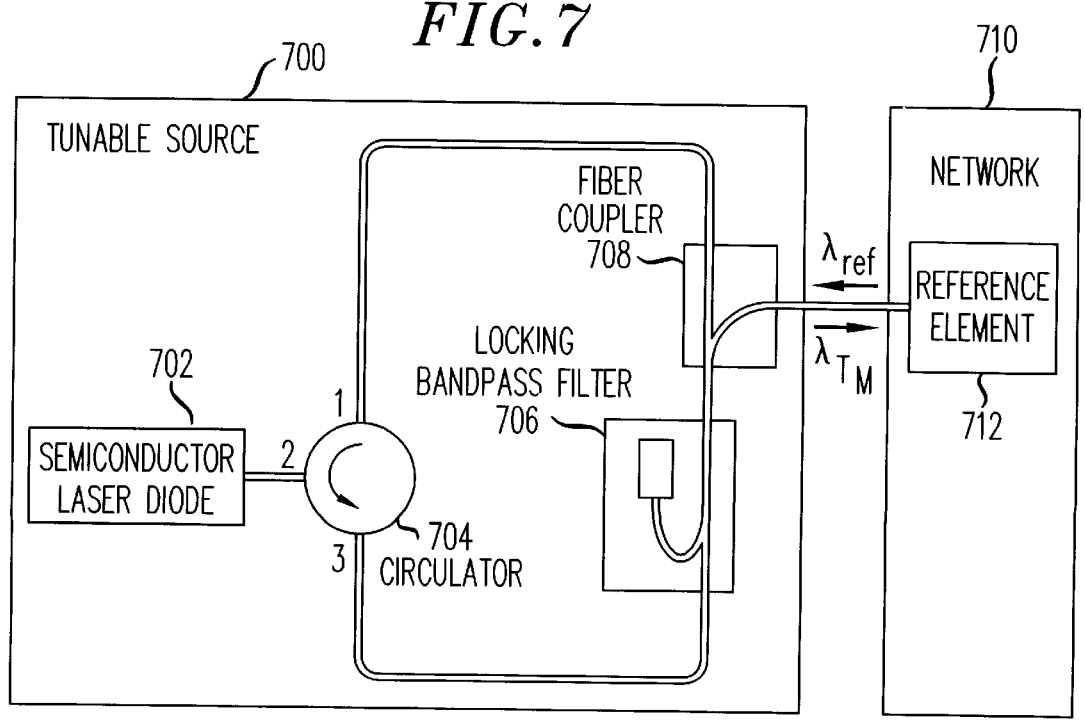

FIG. 7 demonstrates a third embodiment of the tunable source 700. The tunable source 700 employs the use of a semiconductor laser diode 702 which is optically coupled to a circulator 704, having three ports, for maintaining the lasing direction of the signal. The circulator 704 is coupled in parallel to a locking bandpass filter 706 in series with a fiber coupler 708. The fiber coupler 708 is coupled to a reference element 712 in a network 710. The semiconductor laser diode 702 has a plurality of longitudinal modes. In operation, the locking bandpass filter 706 locks its center wavelength to the wavelength of the reference signal. The fiber ring, comprising the circulator 704 and the locking bandpass filter 706, provides feedback to the semiconductor laser diode 702 in a narrow bandwidth substantially equal to the reference signal wavelength. The narrow bandwidth will favor the laser diode mode which is closest to the reference signal and will enable single mode lasing. Ultimately, the signal transmitted to the network 710 is a signal that substantially equals the wavelength of the reference signal.

Note that a Fabry-Perot laser may be used as an embodiment of the semiconductor laser diode 702. In addition, a fiber coupler may be used as an implementation of the circulator 704. Referring to the fiber ring laser in FIG. 5, the frequency range of the semiconductor laser diode 702 can also be implemented with the fiber ring laser.

We claim:

1. A lightwave system comprising:
   a lightwave network wherein said network includes an element which supplies a reference signal at a predetermined wavelength; and
   a tunable source optically coupled to said network wherein, in response to said reference signal, said tunable source is adjustably controlled to generate a source signal substantially at said predetermined wavelength.

2. The lightwave system of claim 1 wherein said reference signal supplying element comprises wavelength selective reflection responsive to said reference signal.

3. The lightwave system of claim 1 wherein said reference signal supplying element comprises a reference signal generating source.

4. The lightwave system of claim 2 wherein said wavelength selective reflection comprises:
   a router for receiving said source signal; and
   a reflector optically coupled to said router for reflecting a predetermined portion of said source signal wherein said router directs said source signal to said reflector and directs said reflected signal to said tunable source.

5. The lightwave system of claim 2 wherein said reference signal generating source comprises a fiber grating responsive to said source signal for reflecting a portion of said source signal to said tunable source.

6. The lightwave system as in claim 1, wherein said tunable source further comprises a laser for generating said source signal and a control arrangement for adjustably controlling the wavelength of said laser to generate said source signal substantially equal to said predetermined reference wavelength.

7. A lightwave system comprising:
   a lightwave network wherein said network includes an element which supplies a reference signal at a predetermined wavelength; and
   a tunable source comprising a laser source having a gain medium, an optical pump source coupled to said gain medium for inducing population inversion said gain medium, and a locking bandpass filter coupled to said gain medium, wherein said locking bandpass filter is responsive to said reference signal for controlling said tunable source to generate said source signal substantially at said predetermined reference wavelength.

8. A lightwave system comprising:
   a lightwave network wherein said network includes an element which supplies a reference signal at a predetermined wavelength; and
   a tunable source comprising a tunable laser, a locking bandpass filter having a passband coupled to said tunable laser for receiving said reference signal and locking said passband center at said predetermined wavelength, and a control arrangement coupled to said locking bandpass filter generating a control signal to adjustably control the wavelength of said laser to generate a source signal substantially equal to said predetermined wavelength.

9. The lightwave system as in claim 8, wherein said control arrangement includes a detector for detecting intensity of said laser signal and generating a signal relative to said intensity, electrically coupled to a control unit for receiving said detector signal and comparing intensity of said laser signal with that of prior transmission of said laser signal to generate said control signal to adjustably control said laser to generate said source signal at a wavelength exhibiting increased intensity.

10. A lightwave system comprising:
    a lightwave network wherein said network includes an element which supplies a reference signal at a predetermined wavelength; and
    a tunable source comprising a semiconductor laser diode for generating a source signal having a control arrangement for controlling said semiconductor laser diode to generate said source signal at wavelength substantially equal to said predetermined reference wavelength, wherein said control arrangement comprises a locking bandpass filter wherein the center of said filter passband is locked substantially to said predetermined wavelength for controlling said laser diode to generate said source signal.

11. A method of tuning a tunable source in a lightwave system including a network having a reference signal generating source, wherein said reference signal generating source generates a signal at a predetermined wavelength, the method comprising the steps of:
    transmitting a reference signal from said network to said tunable source; and
    adjusting said tunable source to generate a source signal, responsive to said reference signal, at a wavelength substantially equal to said predetermined wavelength.

12. A method of tuning a tunable source which generates a source signal in a lightwave system including a network having wavelength selective reflection of said source signal the method comprising the steps of:
    reflecting a wavelength selectable portion of said source signal from said tunable source in said network back to said tunable source; and
    adjusting said tunable source responsive to said reflected signal to generate a source signal at a wavelength substantially equal to said predetermined wavelength.

* * * * *